(12) United States Patent
Blomkvist (10) Patent No.: US 6,299,782 B1
(45) Date of Patent: *Oct. 9, 2001

(54) METHOD AND APPARATUS FOR TREATING LIQUID-CONTAINING MATERIAL BASED ON ORGANIC WASTE PRODUCTS

(75) Inventor: Ove Blomkvist, Osio (NO)

(73) Assignee: Conterra AS, Tonsberg (NO)

( * ) Notice: Subject to any disclaimer, the term of this patent is extended or adjusted under 35 U.S.C. 154(b) by 0 days.

This patent is subject to a terminal disclaimer.

(21) Appl. No.: 09/499,035

(22) Filed: Feb. 7, 2000

Related U.S. Application Data (63) Continuation-in-part of application No. 09/117,815, filed as application No. PCT/NO97/00041 on Feb. 12, 1997, now Pat. No. 6,099,741.

(30) Foreign Application Priority Data

Feb. 13, 1996 (NO) .................................................. 960566

(51) Int. Cl.[7] .............................. B01D 19/00; B03B 5/36; B01F 7/00
(52) U.S. Cl. ...................... 210/750; 210/218; 210/219; 210/319; 422/288; 34/368
(58) Field of Search .................... 210/749, 750, 210/609, 631, 718, 738, 218, 219, 724, 178, 180; 159/47.1; 425/583; 96/204; 422/269, 287, 288; 34/343, 368, 586

(56) References Cited

U.S. PATENT DOCUMENTS

| | | | |
|---|---|---|---|
| 3,788,609 | * | 1/1974 | Toczyski . |
| 4,038,180 | | 7/1977 | Talbert ................................. 210/737 |
| 4,055,494 | * | 10/1977 | Emmett, Jr. .......................... 210/199 |
| 5,570,517 | * | 11/1996 | Luker ..................................... 34/424 |
| 5,724,751 | * | 3/1998 | Ellingsen .............................. 34/354 |

FOREIGN PATENT DOCUMENTS

| | | |
|---|---|---|
| 30 32 887 | 4/1981 | (DE) . |
| 35 46 274 | 7/1987 | (DE) . |
| 0 356 781 | 3/1990 | (EP) . |
| 1521672 | 8/1978 | (GB) . |
| 81/02888 | 10/1981 | (WO) . |

* cited by examiner

Primary Examiner—David A. Simmons
Assistant Examiner—Frank M. Lawrence
(74) Attorney, Agent, or Firm—Birch, Stewart, Kolasch & Birch, LLP (57) ABSTRACT

A continuous process for treating a liquid-containing organic waste material. Sufficient acid is added to the material to achieve a pH of 2 or less in the material. The material is subjected to a beating treatment sufficient to (a) reduce the viscosity of the material, and (b) by heat-generated by friction during the beating treatment and by heat generated by reaction of the acid with the material, raise the temperature of the material so that liquid in the material is vaporized to gases. Sufficient alkaline medium is added to the material such that the pH of the material is raised to at least 5.

24 Claims, 5 Drawing Sheets

METHOD AND APPARATUS FOR TREATING LIQUID-CONTAINING MATERIAL BASED ON ORGANIC WASTE PRODUCTS

This is a continuation-in-part application of U.S. patent application Ser. No. 09/117,815, filed on Aug. 10, 1998, now U.S. Pat. No. 6,099,741.

The invention relates to a method and apparatus for treating liquid-containing materials based on organic waste products, particularly sludge from sewage plants. The treatment is carried out with the particular aim to make the material suitable as a fertilizer or soil improvement medium.

BACKGROUND OF THE INVENTION

Prior treatment plants are based on batchwise feeding of the material into a treatment chamber into which chemicals are added. The chemical additives cause reactions in the material resulting in heat generation and evaporation of liquid, regulation of the pH value and increase of nitrogen in the final product. Then heat is added to the thus chemically treated mass to evaporate liquid and to achieve a desired percentage of solid matter in the final product.

This prior technique suffers from several drawbacks and deficiencies. Thus, batchwise treatment is not an effective approach. Also, the relatively high temperatures which are used (about 425° C.) result in destruction of humic acid and other substances important to soil improvement.

Furthermore, when the reaction processes take place within the mass, gasification of liquid is hampered and the results of the reaction processes are generally lowered. Using external heat for gasification/drying and granulation, after reaction treatment, requires temperatures which are sufficiently low so as to avoid loss of the material substances that are valuable to soil improvement. Various low temperature technology processes may be adapted to this process. However, the properties of the material emanating from the reaction treatment would be of great importance, also for the result of this process.

The prior art also includes continuous processes for treating liquid-containing materials such as sewage sludge, as disclosed in U.S. Pat. No. 4,038,180 an EP-A-0 356 781. However, such prior processes suffer from the same drawbacks as discussed above in connection with batchwise material feeding, and in addition they tend to be less efficient owing to the slow throughput needed to ensure a sufficient sludge dwell time for the required reactions and drying to take place.

The main object of the invention is to provide an approach that permits a continuous process, and that does not require external heating of the sludge to effect the necessary evaporation, while keeping the temperature sufficiently low to avoid loss of any of the substances in the material that are valuable for improving soil.

SUMMARY OF THE INVENTION

The reaction processes are activated when the material is being directly beaten by rotating beating means as it falls through a vertical treatment chamber. Liquid and air are beaten out of the pores of the particles in the solid mass, and compact, free particles are formed under conditions promoting degasification. Also, the liberated liquid presents a relatively large surface promoting evaporation and degasification together with a cooling effect serving to keep the temperature sufficiently low, while the heat developed by the chemical reactions is sufficient to produce the desired evaporation. In such a continuous process free liquid surrounding the particles will effectively absorb heat energy supplied. Also, with compact particles, one is far more free in choosing granulating or pelletizing equipment.

Thus, briefly stated, the invention provides a continuous process for treating a liquid-containing organic waste material, comprising the steps of: adding to the material sufficient acid to achieve a pH of 2 or less in the material; subjecting the material to a beating treatment sufficient to (a) reduce the viscosity of the material, and (b) by heat-generated by friction during the beating treatment and by heat generated by reaction of the acid with the material, raise the temperature of the material so that liquid in the material is vaporized to gases; and adding to the material sufficient alkaline medium such that the pH of the material is raised to at least 5.

The invention also provides an apparatus for treating a liquid-containing organic waste material. The apparatus comprises: a substantially vertical, cylindrical treatment chamber having essentially the same open area throughout the chamber as seen from a feed direction of the material; an upper material inlet on the chamber; a chemical inlet on the chamber; a mixer disposed within the chamber; and a vent at an upper end of the chamber for venting gas from the chamber. The mixer comprises a plurality of beaters mounted on a tubular sleeve, which is rotatable about a tubular body. The beaters extend essentially to adjacent an inner cylindrical periphery of the chamber and are rotatable at speeds sufficient to so frictionally heat the material that liquid therein is evaporated to gases and the material is rendered into a higher solids content.

DESCRIPTION OF THE DRAWINGS

The invention will now be described in more detail below, with reference to the drawings in which.

DESCRIPTION OF PREFERRED EMBODIMENTS

Figure 1:
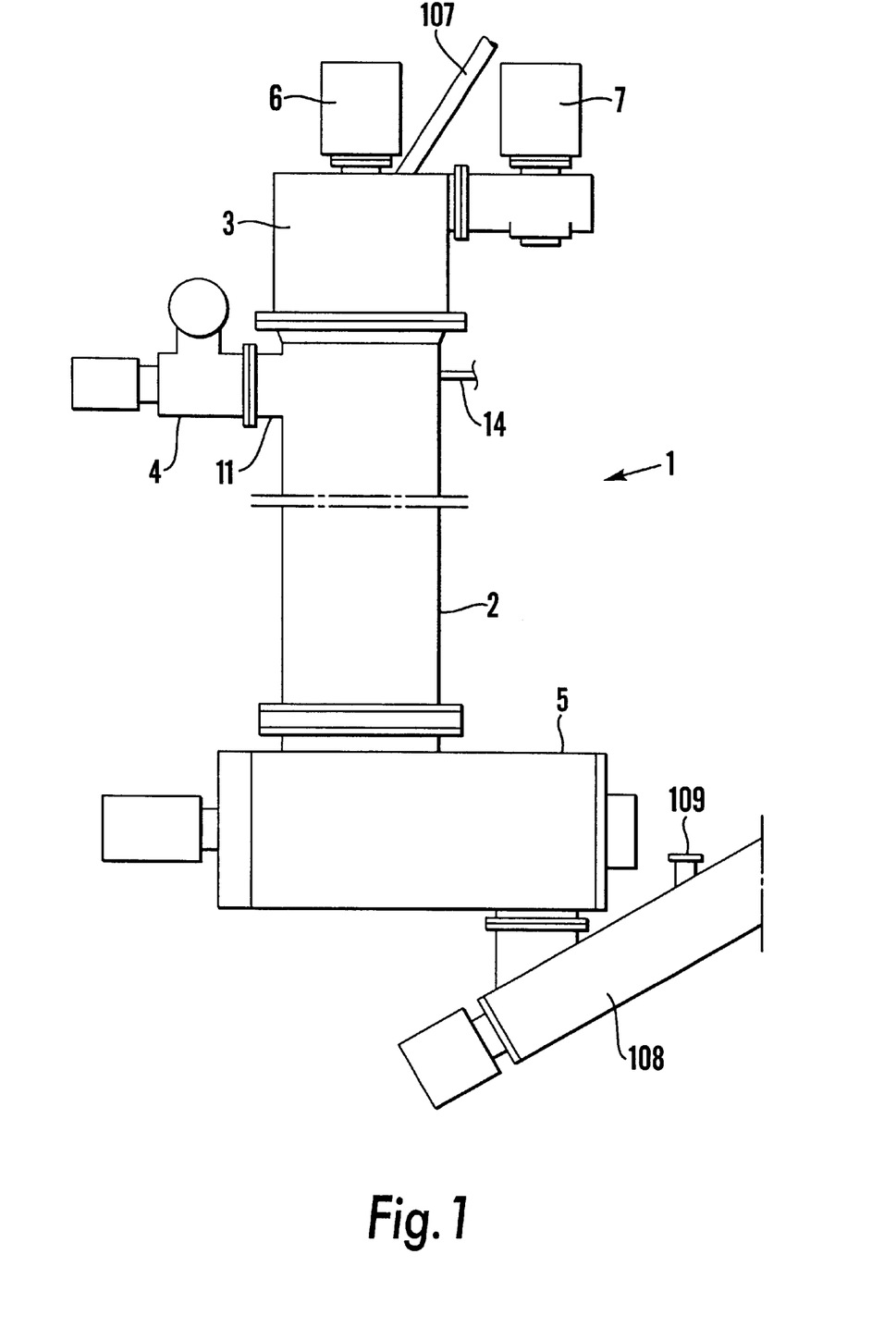
FIG. 1 is an elevational view of an apparatus according to the invention suitable for treating, e.g. sewage sludge.

With reference to FIG. 1, the apparatus 1 according to the invention generally comprises a material treatment chamber 2 having an upper gas withdrawal portion 3, a material feed assembly 4, a material discharge assembly 5 and two drive assemblies 6, 7.

Figure 2:
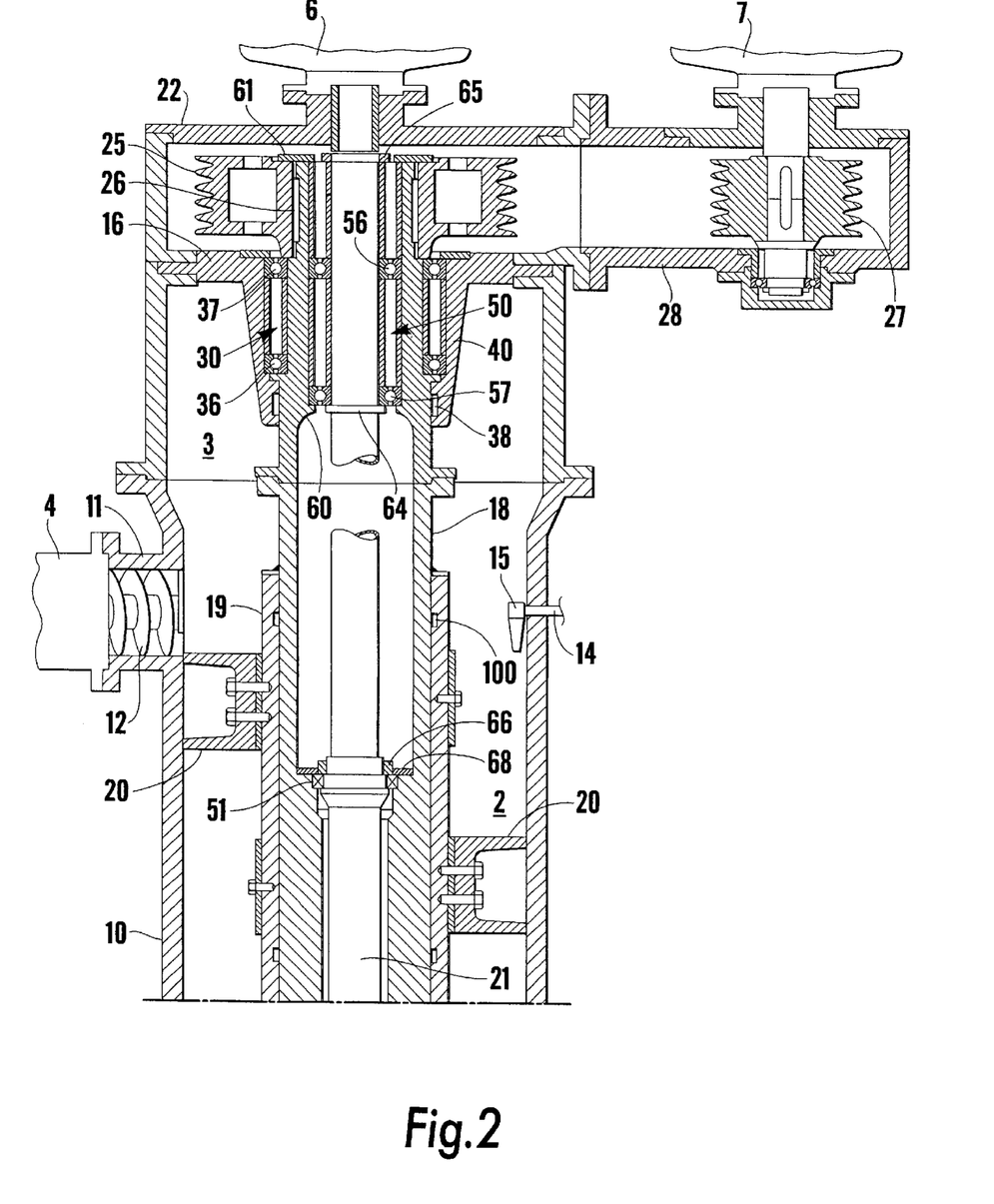
FIGS. 2 and 3 are successive, enlarged longitudinal sectional views of the apparatus according to the invention.
Figure 3:
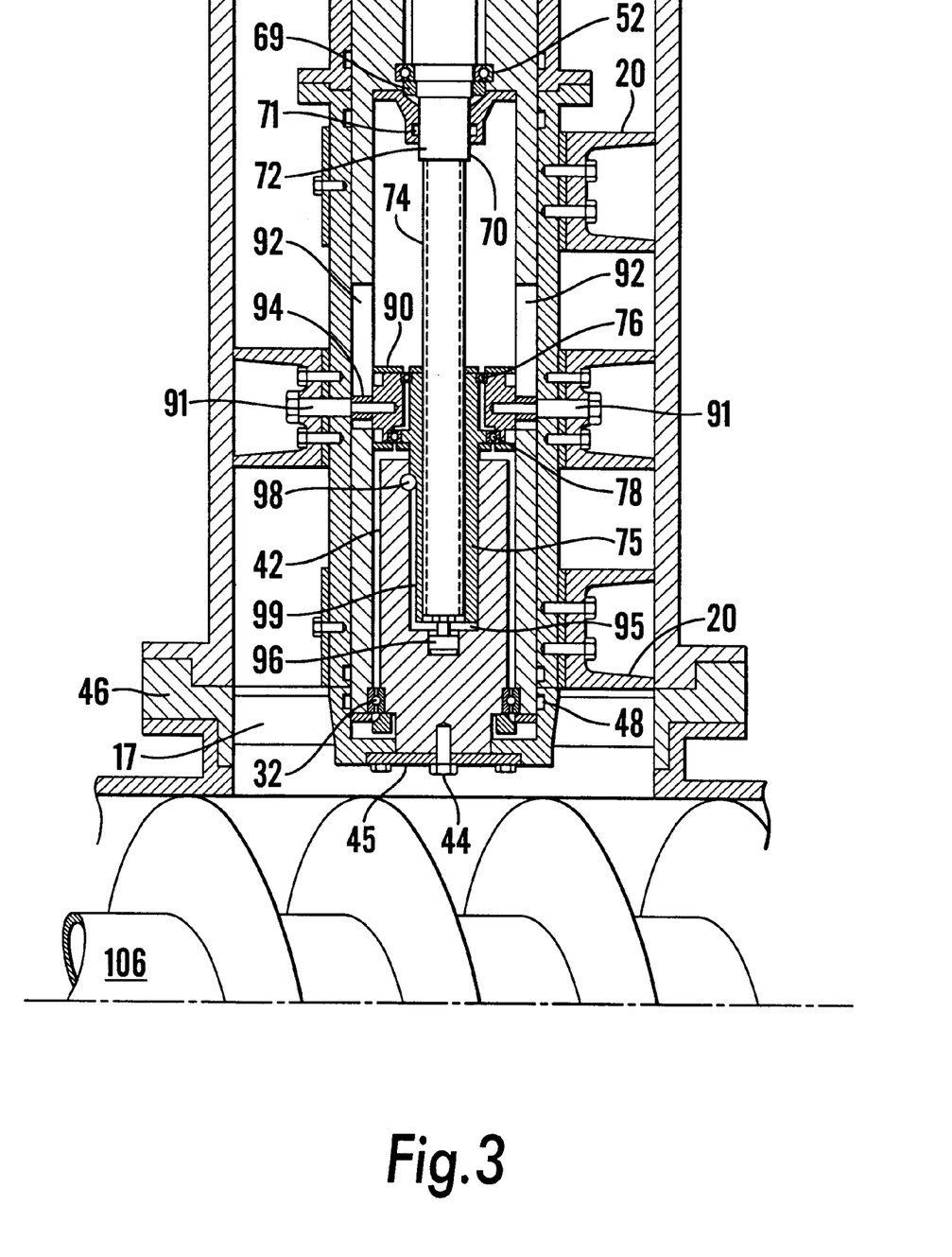

With reference to FIGS. 2 and 3, treatment chamber 2 generally consists of a vertically oriented cylindrical housing 10, which, in the embodiment shown, is conveniently made up of several sections. An inlet 11 is provided with a feed screw 12 for feeding material to be treated and is disposed in the upper part of the chamber 2. Inlets 14, in the form of vertically directed nozzles 15, are provided for adding chemicals and are disposed at the level of or below the material inlet 11. Above inlets 11, 14, the treatment chamber 2 merges into the gas withdrawal portion 3, the top of which is defined by an end wall 16, the bottom of the chamber 2 being defined by an open end or outlet 17 (see FIG. 3).

A tubular body 18 (see FIG. 2) is centrally and rotatably disposed in chamber 2. Rotationally fast but axially slideably surrounding a tubular body 18 is a shorter tubular sleeve 19 carrying a plurality, e.g. eleven, treating means 20.

Internally of the tubular body 18, there is a shaft 21 which is rotatably journalled in the tubular body 18 independently of the rotation of the tubular body. Shaft 21 extends upwardly through a top wall 22 of housing 10, where it is connected to an overhead drive unit 6, such as including an electric motor of a type adapted to impart to shaft 21 a periodical, intermittent rotary motion in opposite directions. A pulley 25 disposed between housing top wall 22 and chamber end wall 16 is keyed at 26 to an upper end of tubular sleeve 19 and driven through to a transmission via not shown pulleys by a drive pulley 27 located in a housing lateral section 28 also carrying the drive motor 7 for driving the drive pulley 27.

In the embodiment of the invention as shown and described herein, the rotational support of the tubular body 18 in the cylinder housing is provided by an upper bearing assembly 30 and a lower or bottom bearing 32 (see FIG. 3). In the example as shown, the upper bearing assembly is made up of two ball bearings 36, 37 spaced by spacer rings and mounted with their outer raceway rings in the upper chamber end wall 16. A seal 38 disposed at the end of a dependent portion 40 of the end wall seals with the outer periphery of tubular body 18.

The bottom bearing 32 (see FIG. 3) is shown as an axial/radial roller bearing, the outer raceway ring of which is locked in the lower end of tubular body 18 and the inner raceway ring of which is locked against a shoulder on a cylindrical pedestal 42 internally disposed at the bottom of the tubular body, with a spacing therebetween, and rigidly secured by a central locking screw 44 and locking disk 45 to a spiderlike configuration of housing 10 at a bottom piece 46 that also defines a lower end of treatment chamber 2. A seal 48 internally disposed in bottom piece 46 seals with the exterior of tubular body 18.

The rotational support of shaft 21 (see FIG. 2) in tubular body 18 comprises an upper bearing assembly 50, an intermediate bearing 51 and a lower bearing 52 (see FIG. 3). The upper bearing assembly 50 consists, like the tubular body upper ring assembly 30, of two ball bearings 56, 57 which are spaced by spacer rings and the outer raceway rings of which are locked, via further upper spacer rings, between an internal shoulder 60 of tubular body 18 and a top locking disk 61. It is also axially locked by pulley 25 and upper tubular body bearings 36, 37 at the inner raceway rings of the tubular body. The inner raceway rings of axial bearings 56, 57 are locked via an upper spacer ring between a collar 64 and a locking ring 65 of shaft 21.

The intermediate bearing 51 is locked in a conventional manner by means of locking ring 66 and locking disk 68, respectively, to shaft 21 and tubular body 18, respectively, while the bottom bearing 52 (see FIG. 3) is locked, also in a conventional manner, to the shaft and tubular body by a locking ring 69 and end cover 70, respectively, the latter being provided with a seal 71 sealing with a portion 72 extending therethrough.

A lower externally threaded extension 74 (see FIG. 3) of shaft 21 cooperates with a longitudinal substantially cylindrical bushing nut 75 having an upper portion which, via bearings 76, 78, are connected to a carrier ring 90 slideably disposed internally of the tubular body and rigidly secured to tubular sleeve 19 by bolts 91 each extending through a respective one of two diametrically opposed, vertically extending slits 92 formed in tubular body 18. In the shown example, bolts 91 also extend through a respective treating means 20. A bushing 94 surrounds each bolt 91 between tubular sleeve 19 and carrier ring 90.

A lower end portion of the threaded extension of the shaft depends into a cylindrical bore 95 formed in the pedestal 42 and sized to receive, with a certain clearance, a lower portion of nut 75 in the bottom position thereof as shown in FIG. 3. Shaft 21 has a bottom locating pin 96 received in a mating recess in the bottom of the pedestal bore. In the upper part of the pedestal bore, there is a locating lug 98 extending into a mating longitudinal groove 99 in the external periphery of the bushing nut 75, thus keeping the nut rotationally at rest during rotation of the shaft.

The tubular sleeve 19 is, as previously noted, axially slideable on the exterior of the tubular body 18, e.g. with a radial spacing of about 1.4 mm. Seals 100 seal with the exterior of the tubular body 18.

When shaft 21 is periodically rotated in opposite directions, nut 75 will move upwardly or downwardly on the shaft, depending on the rotational direction of the shaft, thereby imparting to the tubular sleeve, via carrier ring 90 and bolts 91, a corresponding axial motion up and down on the tubular body, with a length of stroke of e.g. 100 mm.

In FIG. 3, nut 75 with tubular sleeve 19 is, as previously noted, shown in a bottom position, while FIG. 2 shows tubular sleeve 19 in its top position.

The treating means 20 mounted on the exterior of the tubular sleeve 19 may have any shape suitable for their purpose, namely to forcefully hit or beat the sludge material during its sinking through the treatment chamber 2, while simultaneously serving to effectively intermix the chemicals added in the chamber into the sludge material.

Figure 4:
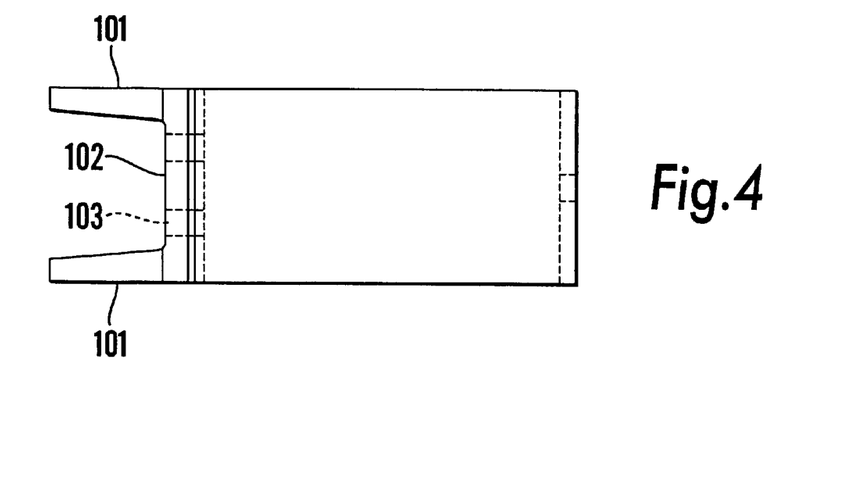
FIGS. 4, 5 and 6 are elevational, plane and cross-sectional views, respectively, of details of a treating element.
Figure 5:
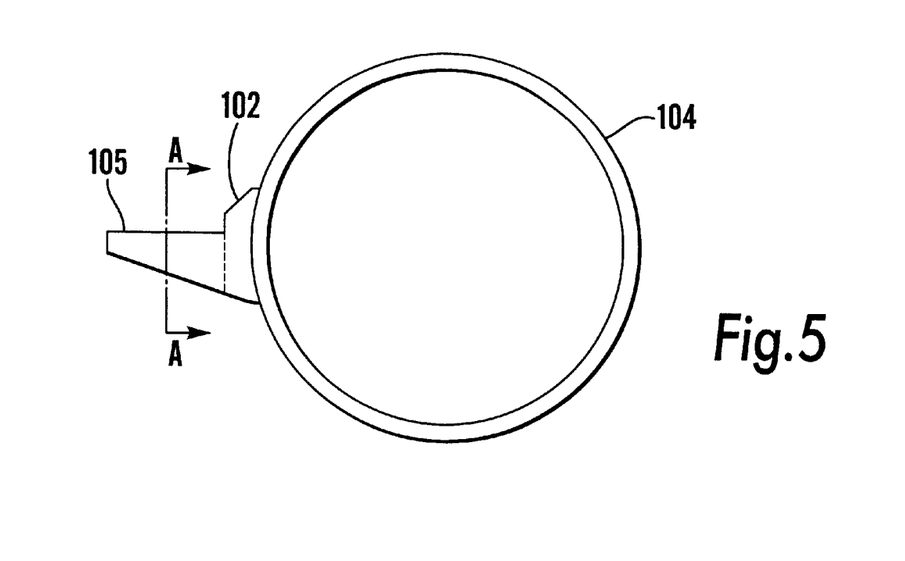
Figure 6:
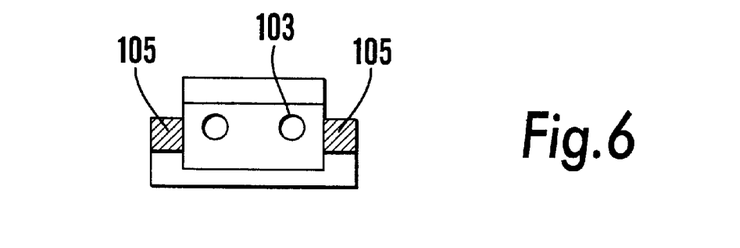

As best shown in FIGS. 4 through 6, the treating means 20 may consist of a plurality of generally U-shaped elements having two legs or teeth 101 which, when the elements 20 are mounted on the tubular sleeve, extend radially outwardly toward the internal peripheral surface of the cylindrical housing with a small spacing therebetween, and an intermediate base portion 102 having mounting holes 103 for securing the element to the tubular sleeve. Each element 20 may advantageously be mounted on a carrier ring 104 adapted to be threaded onto the tubular sleeve and secured to the latter by screws. The teeth 101 have a generally flat impact surface 105, i.e. the front surface hitting the sludge material during operation of the apparatus according to the invention. The treating elements 20 are evenly distributed downwardly along the periphery of the tubular sleeve 19, as shown n FIGS. 2 and 3. Preferably, the axial spacing between the elements 20 is somewhat less than the stroke of the nut assembly 75, so that their end positions overlap.

In order to provide for a dwell time of the material in the treatment chamber 2 sufficient to allow the desired chemical reactions to take place in a complete manner, the treatment chamber 2 should have a length of about 2 meters below inlet 11.

The method according to the invention, when using the above-described apparatus, is substantially as follows.

Having started the drive assemblies 6, 7, the material to be treated, such as sludge at a dry content of 20–30%, a temperature of about 20° C. and typically a pH of about 6, is continuously fed into treatment chamber 2 through inlet 11 by means of feed screw 12. Simultaneously, as a first step, pressurised concentrated acid, e.g. an inorganic acid such as sulphuric acid, phosphoric or nitric acid, preferably sulphuric acid, is introduced through chemical inlet 14. The addition of acid is controlled against the pH of the incoming material. Typically about 10–15 weight-% of concentrated acid, calculated on the material, is added, whereby the material reaches a pH of below 2, preferably a pH of 1 or below. By the addition of acid, the material is subjected to a rapid hygienization, whereby microorganisms and bacteria are destroyed.

Since the cylindrical treatment chamber 2 has essentially the same open area throughout the chamber as seen from a feed direction of the material, the mixture of sludge and acid sinks by gravity down through the treatment chamber at a substantially constant velocity, by which the porous organic material is uniformly exposed to the beating action of the rapidly rotating treating means 20, as a second step, which also cause a strongly turbulent environment positively serving to intermix the in-flowing acid into the material. In other words, the front surfaces 105 of the treating means 20 are beating the acid into the particles of the material and are also beating out liquid and gases trapped in pores in the solid contents of the material and are thus effectively separating the liquid from the solid matter, to permit the latter to assume the shape of relatively compact particles. Thus, the viscosity of the material is strongly reduced, which facilitates the following treatment of the material.

The importance of the treatment chamber 2 having essentially the same open area throughout the chamber, as seen from the feed direction, will be better understood from the following explanation. Tenacious and sticky sludge will result in an accumulation of sludge in the chamber, if the chamber exhibits an open area which is reduced in the feed direction of the material. Thereby, a continuous and even flow of the sludge will be prevented, which in its turn will result in an impaired treatment of the sludge in the chamber. The treatment process in the reaction chamber 2 is optimal when the sludge is treated in a continuous and even flow through the chamber. Additionally, the continuously added acid or ammonium, as hereinafter described, should accurately correspond to the amount of sludge being fed into the chamber. At the same time, the heat generated from the reaction and friction should ensure that the process temperature is accurately obtained in the sludge as it moves downwards in the feed direction in the chamber 2. To obtain this, the beaters should be provided with a continuous and even flow of sludge. Therefore, the treated sludge will require a free outlet, without obstructions in the form of a decreased open area, from the reaction chamber to a conveyor screw or the like. The amount of treated sludge which is fed out from the chamber per time unit should be equal to the amount of sludge and liquid which is fed into the chamber per time unit, minus the amount of evaporated gases. Thus, it is of substantial importance that the treatment chamber has essentially the same open area throughout the chamber as seen from a feed direction of the material.

By the reaction of the acid with the material and by the solving of the acid in the liquid phase of the material, the temperature is raised in the acid treatment step. The temperature in the liquid phase could be very high, up to or above 100° C., but is lowered again as the material travels down through the treatment chamber and a temperature levelling is effected between the hot liquid and the cooler dry substance particles of the material. The temperature is however kept at a high level by frictional heating due to the beating treatment, throughout the treatment chamber, leading to a temperature in the material which is leaving the acid treatment step, which is 20–40° C. higher than the temperature of the incoming material. The high temperature in the acid treatment step, especially in its initial part, is beneficial for the hygienization of the material, which typically takes place in less than a minute, and also results in an evaporation of liquid. Evaporated free and liberated liquid in the material flows upwardly in the treatment chamber, together with liberated gases from the reactions and from the beating of the material. The thus liberated vapours and reaction exhaust gases are ascending through the degassing portion, and are vented through a conduit 107 (FIG. 1) to a condenser, for example, the condensate of which will be suitable for use as a liquid fertiliser. The evaporation is preferably caused only by the reactions of the material with the acid and by the frictional heating, there being no need for any external heating means, although it is not excluded that such external heating means may be used to maintain the temperature. Suitably, the reaction chamber is insulated and/or is thick-walled, to retain the temperature.

The frictional heating and the mixing effect of the rotating treating means 20 is enhanced by vertical overlapping travels of the rotating and axially displaceable treating means 20. The outer end portions of the treating teeth 101 serve as scrapers against the internal surface of the treating chamber 2, thus keeping the latter free of deposits. The treating means 20 extend essentially to adjacent the inner cylindrical periphery of the treatment chamber. Suitably, there is a clearance of 1–5 mm, preferably 1.5–3 mm, between ends of the beaters, i.e. the treating teeth 101 and the inner cylindrical periphery of the inner wall of the treatment chamber, which clearance is adapted to the type of material treated, to yield frictional heating, besides the scraping effect. A suitable rotational speed of tubular sleeve 19 with its treating means, is 3000 rpm at the most and preferably 1500 rpm at the most. The frequency of the periodical vertical and axial motion of the treating means 20 is determined in relation to the percentage of solid content of the material feed, about 3000 cycles per minute being suitable for an initial solid matter content of about 30%.

The apparatus having essentially the same open area throughout the treatment chamber and the open end or outlet 17 as seen in the feed direction, causes the acid-treated material to flow by gravity down through the apparatus at essentially a constant velocity, as seen in the feed direction, throughout the apparatus and through the open end or outlet 17 (see FIG. 3). Then, by means of the conveyor screw 106 (FIG. 3) of discharge assembly 5 (FIG. 1) via additional conveyor screw or other suitable means 108, the acid-treated material is carried into a further treatment apparatus 1 of the construction shown in FIGS. 1–3 and described above, as shown in FIG. 7. Upon the entrance into the further treatment chamber, the material has a temperature level which is maintained from the preceding step, and a dry matter content which is about 10% higher than its initial dry matter content.

In this third treatment step (see FIG. 7), an alkaline medium, preferably ammonium, is added through the chemical inlet 14. If desired, additional additives to take part in the ammonium treatment are inserted through side inlets 109 (FIG. 1) in a conveyor screw 108 between the two treatment apparatuses 1—1, continuously proportioning the weight of additives relative to the mass being treated. The amount of added ammonium will normally be about 30% of the weight of acid used, resulting in a nitrogen content in the material of about 10%. By the addition of ammonium, the pH is raised to at least 5, preferably at least 6, at the same time as the temperature is raised due to the reactions taking place and the solving of the ammonium in the liquid phase. As in the first and second step, i.e. the acid treatment step and the beating step, the temperature is additionally raised by frictional heat caused by the beating action of the treating means 20. Thereby, the temperature of the liquid phase is raised again to up to 100° C. or above, and in the end, the temperature of the material is raised by 30–50° C., at most to 100° C., in relation to its incoming temperature in the third step. As in the acid treatment step and beating step, vapours and reaction exhaust gases are vented through conduit 107 and are condensed to a liquid fertiliser, suitably together with the vented vapours and gases from the first step.

After the treatment steps as described, the material is hygienizised, displays an increased temperature level, an increased content of sulphur and nitrogen, and an increased dry content level, typically at least 10% and preferably at least 15% higher than the initial material. Furthermore, the material has a considerably lowered viscosity, the individual particles being more compact, which greatly facilitates the subsequent drying of the material.

In the subsequent additional treatment step, the material, with its beneficial high temperature and relatively low viscosity, is dried and pelletized to pellets with a dry content of 85–95%, preferably 90–95%. Without the viscosity-lowering treatment, it would be very energy consuming and difficult to reach such high dry contents. Moreover, the facilitated drying results in pellets which have essentially the same dryness through their entire cross-section, not having a moist core, whereby the pellets can be stored for a long time without deteriorating.

Figure 7:
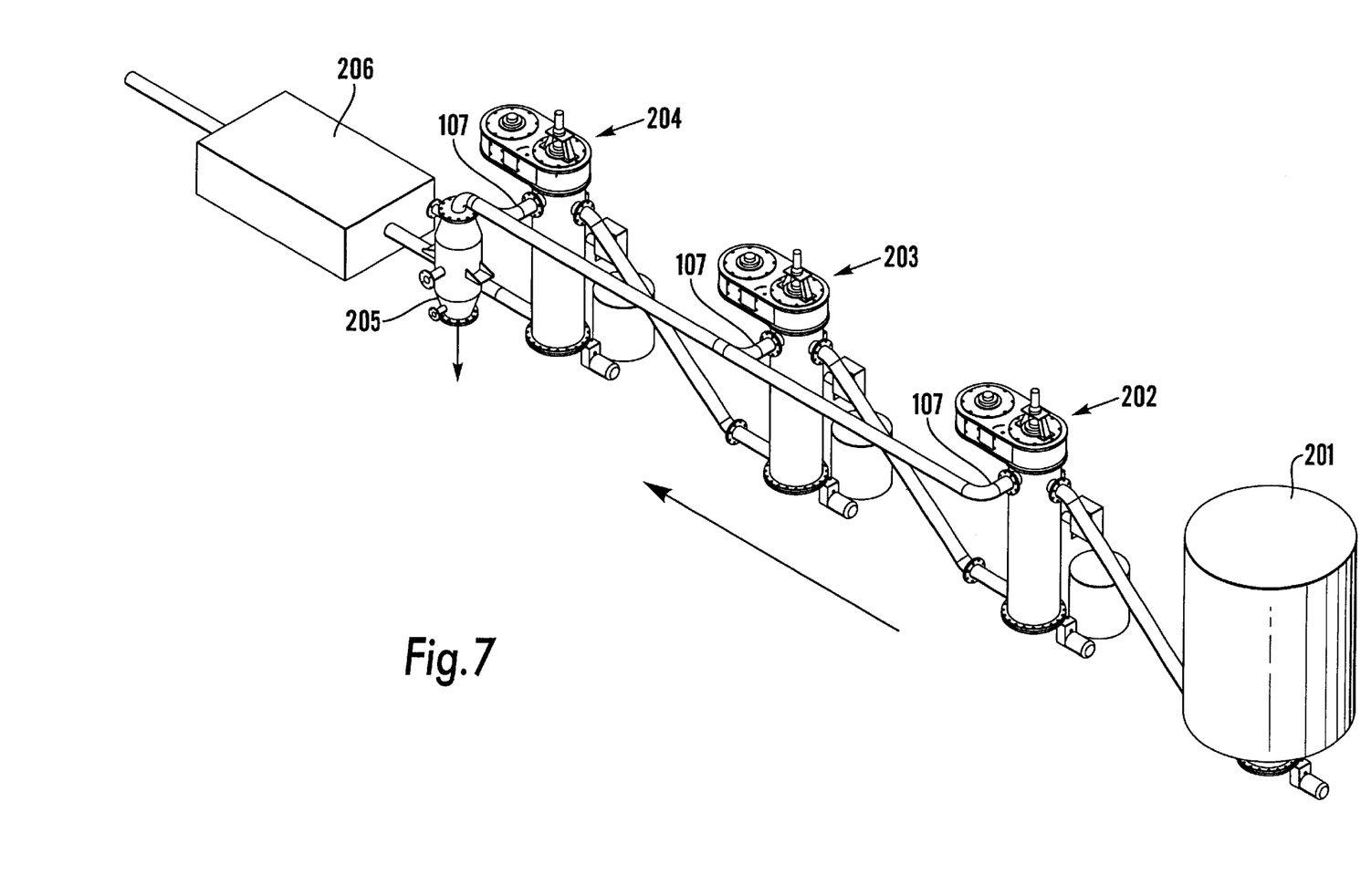
FIG. 7 is a perspective view of an integrated treatment system.

It is also practical to treat the material in an introductory step, preceding the described treatment steps, whereby the material is subjected to initial beating treatment in an apparatus of the type shown in FIGS. 1–3; however, possibly made of a cheaper steel, such as carbon steel. In FIG. 7, there is shown a process line including a sludge tank 201, followed by an apparatus 202 according to the invention, for such an introductory beating step, an apparatus 203 for the acid treatment step and beating step and an apparatus 204 for the ammonium treating step. Also, there is shown a condenser 205 to which the conduit 107 connects for vented vapours and gases. Drying equipment 206 for drying and pelletizing is also shown. In the introductory treatment step, in apparatus 202, the material is preferably not subjected to chemical treatment, but only to a physical treatment, whereby liquid and air trapped in pores in the solid contents of the material is beaten out, the viscosity of the material being initially lowered and the temperature being raised by frictional heating.

Furthermore, the treatment with alkaline medium may be followed by a further step (not shown in FIG. 7), in an apparatus of the type shown in FIGS. 1–3, however possibly made in a cheaper steel, such as carbon steel. In this further step, there may be added nutritional additives to the material, such as primary soil nutritional additives, micro-organic additives, humic acids, chalk etc., in order to raise the soil nutritional value of the end product. The end product may thereby be tailor made for different needs, i.e. different soils and different crops.

Factors of importance to the treatment process, such as temperature, pH value, nitrogen content etc. in the sludge material, are measured continuously or intermittently and are simply controlled by controlling the speed of feed of the material and the amount of chemicals added.

What is claimed is:

1. A continuous process for treating a liquid-containing organic waste material, comprising the steps of:

(1) adding to the material sufficient acid to achieve a pH of 2 or less in the material;

(2) subjecting the material to a beating treatment sufficient to (a) reduce the viscosity of the material, and (b) by heat-generated by friction during the beating treatment and by heat generated by reaction of the acid with the material, raise the temperature of the material so that liquid in the material is vaporized to gases; and (3) adding to the material sufficient alkaline medium such that the pH of the material is raised to at least 5.

2. The process of claim 1, wherein the acid is nitric acid, phosphoric acid or sulphuric acid and the amount added is controlled against a pH of the incoming material.

3. The process of claim 1, wherein the pH is lowered to 1 or below by the addition of acid.

4. A process of claim 1, wherein a velocity of the material, in the feed direction, is essentially the same throughout steps (1) and (2).

5. The process of claim 1, wherein the temperature of the material is raised by 20–40° C. in step (2).

6. The process of claim 1, wherein evaporated gases are withdrawn and are condensed to make a liquid fertilizer.

7. The process of claim 1, wherein the material is at essentially the same temperature at which the material leaves step (2) when treated with the alkaline medium of step (3).

8. The process of claim 1, wherein the alkaline medium is ammonium.

9. The process of claim 1, wherein in step (3) the pH is raised to at least a pH of 6.

10. The process of claim 1, wherein in step (3) the material is subjected to a further beating treatment.

11. The process of claim 1, wherein in step (3) the temperature of the material is raised at most to 100° C.

12. The process of claim 1, wherein the gases from step (2) are withdrawn and are condensed to make a liquid fertilizer.

13. The process of claim 1, wherein the dry solids content of the material is raise by at least 10% in steps (1) and (2).

14. The process of claim 1, wherein the material is subjected to a beating treatment in an introductory step before step (1) whereby liquid and air trapped in pores in solids in the material are beaten out.

15. The process of claim 1, wherein after step (3) the material is subjected to an additional step in which there is added soil nutritional additives to the material.

16. The process of claim 1, wherein the treated material is dried and pelletized to pellets with a solids content of 85–95%.

17. An apparatus for treating a liquid-containing organic waste material comprising: a substantially vertical, cylindrical treatment chamber (2) having essentially the same open area throughout the chamber as seen from a feed direction of the material; an upper material inlet (11) on the chamber; a chemical inlet (14) on the chamber; a mixer disposed within the chamber; and a vent at an upper end of the chamber for venting gas from the chamber, and wherein the mixer comprises a plurality of beaters (20) mounted on a tubular sleeve (19) which is rotatable about a tubular body (18), said beaters (20) extending essentially to adjacent an inner cylindrical periphery of the chamber, and being rotatable at speeds sufficient to so frictionally heat the material that liquid therein is evaporated to gases and the material is rendered into a higher solids content.

18. The apparatus of claim 17, wherein the beaters (20) have a clearance between ends thereof and the inner cylindrical periphery of about 1–5 mm.

19. The apparatus of claim 17, wherein the tubular body (18) is centrally located in the chamber.

20. The apparatus of claim 18, wherein the tubular member (18) coaxially surrounds and is operably connected to an independently rotatable support shaft (21).

21. The apparatus of claim 20, wherein the shaft (21) has a threaded portion (74) cooperating with a nut (75) which is connected to the tubular body (18).

22. The apparatus of claim 21, wherein the connection to the tubular body (18) is by way of bolts (91) extending through vertical slits (92) formed in the tubular body (18).

23. The apparatus of claim 17, wherein the beaters (20) have teeth (101) which extend radially outwardly from sleeve (19) and have a substantially flat impact surface (105).

24. The apparatus of claim 17, wherein the beaters (20) are axially slideable on an exterior of the tubular body (18).

* * * * *